United States Patent [19]

Hochreiter et al.

[11] Patent Number: 5,313,249

[45] Date of Patent: May 17, 1994

[54] ARC-SEGMENT-SHAPED GATE FOR PHOTOGRAPHIC FILM SCANNING APPARATUS

[75] Inventors: Eric P. Hochreiter, Bergen; Franklin D. Ehrne, Rochester; Gary L. Erck, Webster, all of N.Y.

[73] Assignee: Eastman Kodak Company, Rochester, N.Y.

[21] Appl. No.: 943,425

[22] Filed: Sep. 14, 1992

[51] Int. Cl.[5] .................... G03B 27/58; G03B 27/62
[52] U.S. Cl. ........................................ 355/47; 355/76
[58] Field of Search ..................... 355/47, 48, 75, 76, 355/50, 104, 108, 109, 111; 352/228, 229, 230; 353/95; 242/55, 71, 76; 226/76, 83, 84, 85

[56] References Cited

U.S. PATENT DOCUMENTS

3,473,874  10/1969  Hall et al. .............................. 355/52
4,774,553  9/1988  Blanding et al. ....................... 355/75
4,965,632  10/1990  Jadrich et al. ......................... 355/76

Primary Examiner—Michael L. Gellner
Assistant Examiner—D. P. Malley
Attorney, Agent, or Firm—Edward Dugas

[57] ABSTRACT

An arc-segment-shaped gate for a photographic film scanning apparatus has a six inch radius from a pivot shaft of the gate to the outermost surface at which the scanning of the film is to occur. The gate is pivoted around a pivot axis through an optical chassis of the scanning apparatus and is driven by a worm-gear segment arrangement via a reversible electric motor. The gate swings through an arc of approximately 6½° on each side of a vertical initializing position of the gate and has an aperture at which a frame of the film can be held against the gate by a clamping arrangement which is moved with the gate. The gate of the present invention is that the gate is mounted to be adjusted about a spherical bearing by the use of bearings mounted on eccentric shafts against which a wear plate on the gate is registered. Pins and biasing springs mounted on the gate and the gate system drive allow adjustment of the gate in $\Theta$ X and $\Theta$ Z directions for obtaining precise optical alignment.

18 Claims, 10 Drawing Sheets

ARC-SEGMENT-SHAPED GATE FOR PHOTOGRAPHIC FILM SCANNING APPARATUS

FIELD OF THE INVENTION

The present invention relates to a gate and method of operation therefore in a photographic film scanning apparatus, and, more particularly, to a gate configured as an arc segment of a circle and driven to move in a pendulum-like manner so as to scan images on a photographic film in both directions of movement of the gate.

BACKGROUND ART

Several types of scanning apparatus for scanning negative still and motion picture films are known and currently used by photographic labs. Eastman Kodak Company now offers a PIW 2200 system which uses a Kodak 2000 scanner having a flat gate for handling film strips and slides to digitize an excellent high resolution image for storage on a compact disc. This scanner cannot handle continuous rolls of film as would be desirable for large numbers of orders. Another type of scanner uses a drum for scanning motion picture film. Other types of drum scanners are known for scanning continuous rolls of film or single negative, although no drum scanner does both. In addition, screw-driven flat bed scanners are known. All of the known scanners have, however, limitations in terms of their versatility in that they are not capable of providing a high resolution scan while, at the same time, avoiding the need for interchangeability for handling first order and reorders for photographic processing labs.

In a known scanning apparatus for digitizing the images on photographic film, a circular drum is used as the gate and has several arcuate portions disposed thereover for handling first order runs consisting of twelve, twenty-four or thirty-six exposures which are spliced, and reorder using the Kodak paper laminate standard and the URS paper laminate standard. It has been found, however, that such a drum is unnecessarily complicated and requires an undesirable space to accommodate the entire drum for handling the different formats. In addition, the movement of the gate is not minimized to perform the scanning operation.

DISCLOSURE OF THE INVENTION

It is, therefore, an object of the present invention to eliminate the disadvantages associated with known circular drum gates or the lack of flexibility of flat gates by providing a gate having a pie-slice-shaped or circular arc segment configuration which undergoes a pendulum motion to transport the image being scanned and thereby provide scanning of film images in both directions of the gate movement, thereby minimizing the structural outlays needed for the gate and greatly simplifying the scanning operation.

An advantage of the present invention is that this arrangement is both simpler and allows different types of formats or orders to be run without any structural changes in the scanning apparatus. That is, the scanning apparatus can process first order runs consisting of twelve, twenty-four, and thirty-six exposures of photographic film spliced together on a reel, film strips with paper laminate using the Kodak system and film with laminate using the URS system on reels which allow a large production run to be made with consequent savings.

According to one embodiment of the present invention, the arc-segment-shaped gate has a six inch radius from a pivot shaft of the gate to the outermost surface at which the scanning of the film is to occur. Although the prior art has recognized the advantage of a curved surface for maintaining flatness of photographic film for high resolution scanning of the film image into a digitized form, the present invention also utilizes the gate and its curvature for transport of the film during the scanning process. The gate according to the present invention is pivoted around the pivot axis on an optical chassis of the scanning apparatus and is driven by a worm-gear segment arrangement via a reversible electric motor. The gate swings through an arc of approximately 6½° on each side of a vertical initializing position of the gate and has an aperture at which a frame of the film can be held against the gate by a clamping arrangement which is moved with the gate.

An important advantage of the gate of the present invention is that the gate is mounted in a way which allows it to be adjusted about a spherical bearing pivot axis by the use of bearings mounted on eccentric shafts against which a wear plate on the gate is registered. Pins and biasing springs mounted on the gate and the gate system drive allow adjustment of the gate in ΘX and ΘZ directions for obtaining perfect optical alignment.

BRIEF DESCRIPTION OF THE DRAWINGS

These and other features, objects and advantages of the present invention will become more apparent from the following detailed description of currently preferred embodiments of the gate when taken in conjunction with the accompanying drawings wherein.

MODES OF CARRYING OUT THE INVENTION

Figure 1:
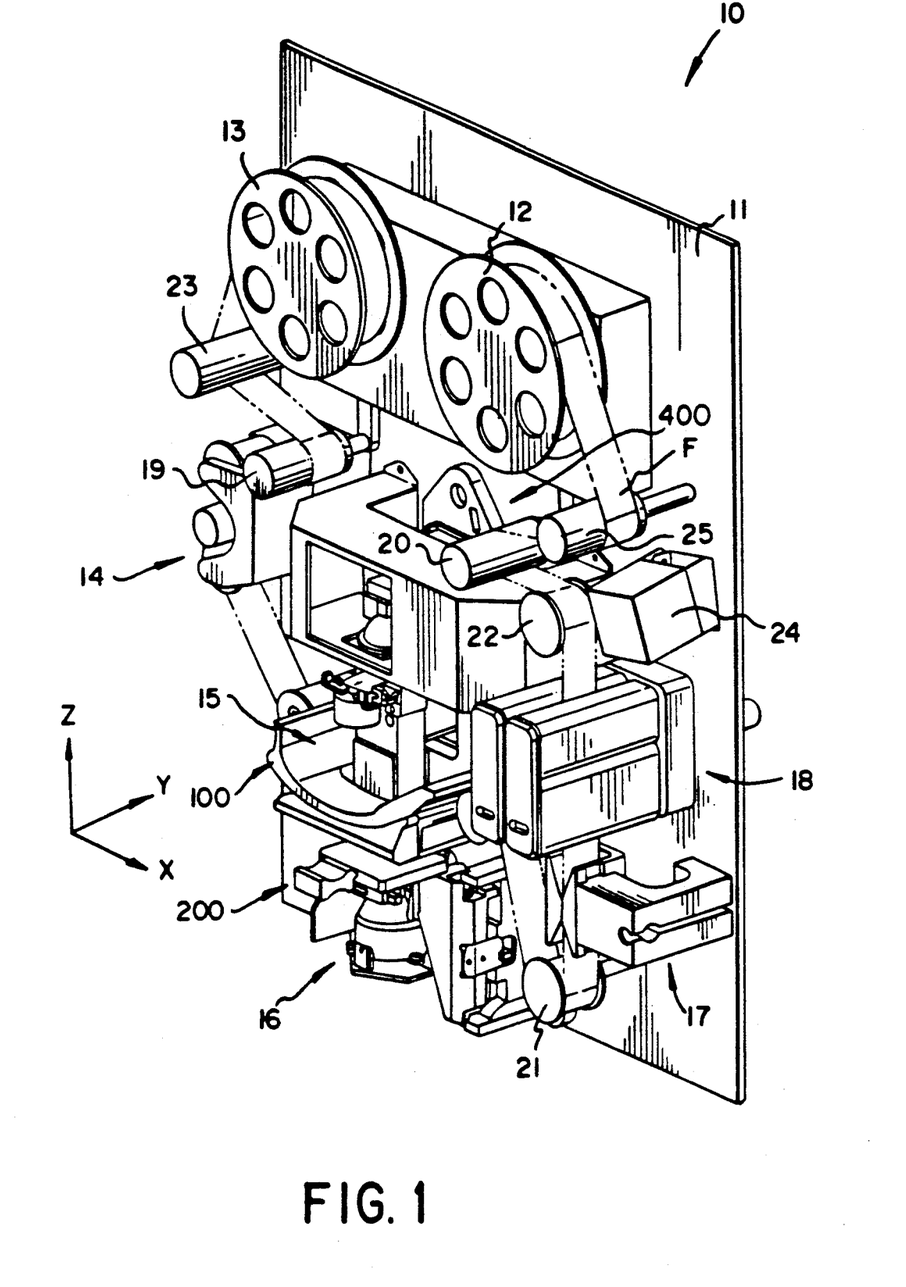
FIG. 1 is a perspective view of the major components of the scanning apparatus mounted on a board.
Figure 2:
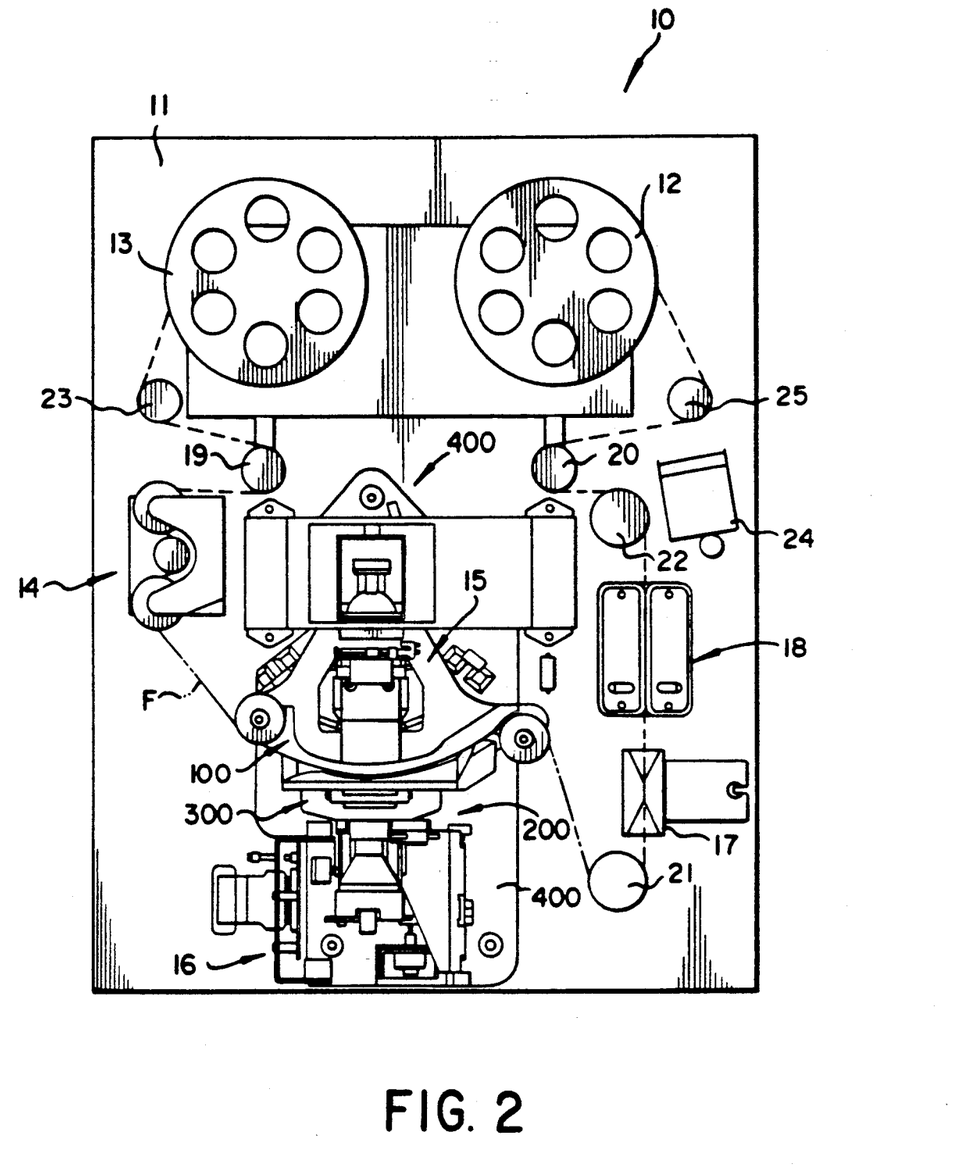
FIG. 2 is a front view of the scanning apparatus shown in FIG. 1.

Referring now to the drawings and, in particular, to FIGS. 1 and 2, a photographic negative film scanning apparatus for scanning and digitizing images on frames of the film is designated generally by the numeral 10. The apparatus 10 includes a board 11 on which are mounted conventional film transport reels 12, 13, a capstan drive 14, an integrating cavity 15, a conventional imager with imaging board designated generally by the numeral 16, a DX bar code reader 17 for determining the type of film being scanned, a film cleaning apparatus 18, a bar code reader 24 for reading order processing data, and spring-biased tension rollers 19, 20 to maintain the film at a substantially constant tension during the high resolution scanning pass. In addition, other idler rollers 21, 22, 23 and 25 are mounted on the board 11 to maintain a smooth but tight path for the film F shown in long and short dash lines. A gate 100 mounted on an optical chassis 400 and seen in more detail in FIGS. 3-9, is rotated, during the high resolution scanning pass in an arc of about 6½° on both sides of a vertical axis constituting an initializing position in which the gate assumes during the low resolution operation.

The optical chassis 400 is described in co-pending application Ser. No. 943,426, entitled OPTICAL CHASSIS, filed in the names of Eric P. Hochreiter, et. al. on Sep. 14, 1992. The film F which is supplied from reel 12 shown in FIGS. 1 and 2 is advanced by the capstan mechanism 14 by pulling the film F from the supply reel 12 over the gate 100 and onto the take-up reel 13. It will be understood, of course, that the capstan mechanism 14 can be disposed on the right-hand side of the scanning apparatus to push the film F over the gate 100 without departing from the scope of the present invention.

A lens protector device 200 is provided in close proximity to the optical scanning mechanism to protect its lens from dust and the like as more fully described in co-pending application Ser. No. 943,424 entitled LENS PROTECTOR DEVICE, filed in the names of Tomi Lahcanski, et. al. on Sep. 14, 1992. Inasmuch as the details of the lens protecting device 200 and the optical chassis 400 are not necessary for an understanding of the present invention, further details with respect thereto are dispensed with and the contents of said applications are incorporated by reference herein for background as to the overall construction of the scanning apparatus.

Figure 3:
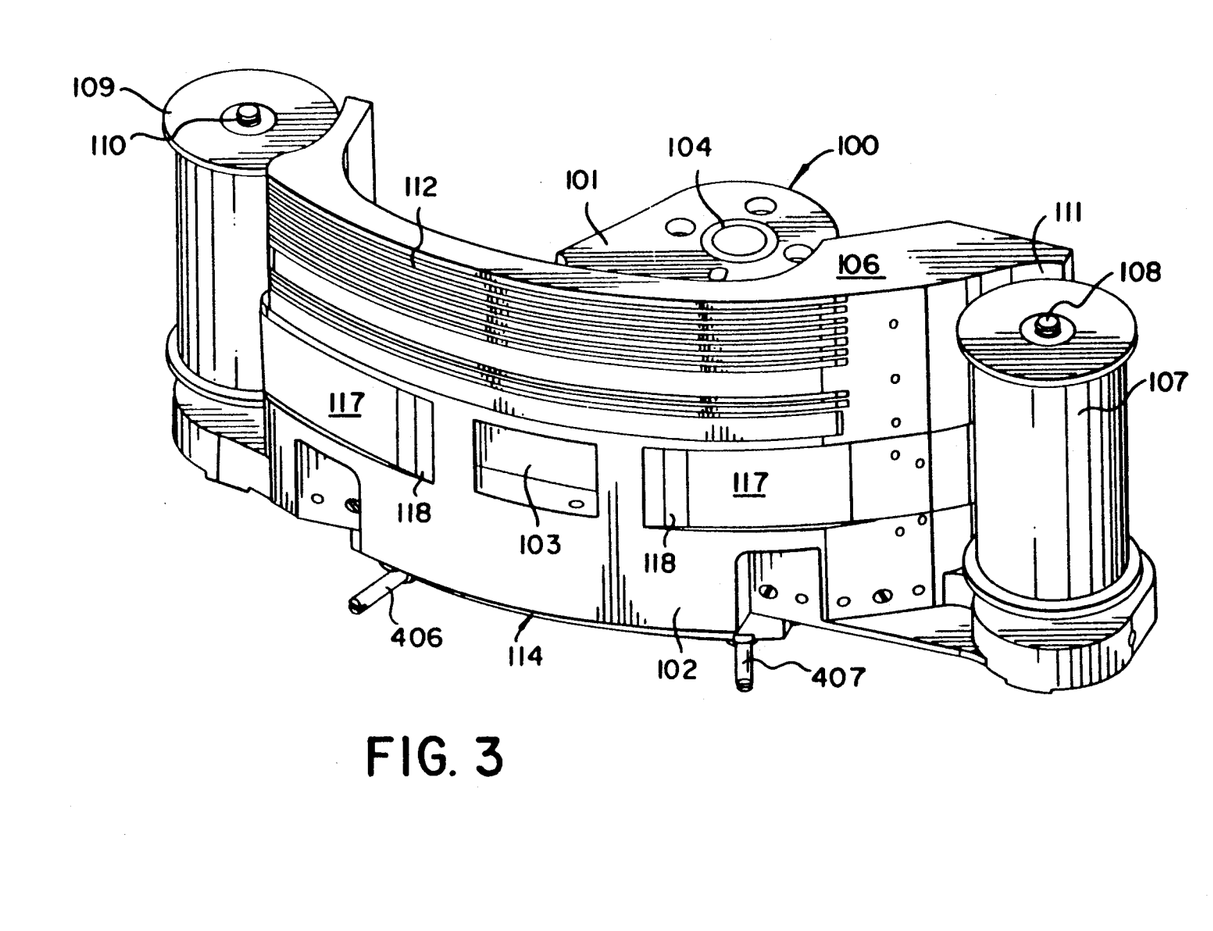
FIG. 3 is a perspective view taken along the bottom or scanning surface of a first embodiment of the gate shown in FIGS. 1 and 2.
Figure 4:
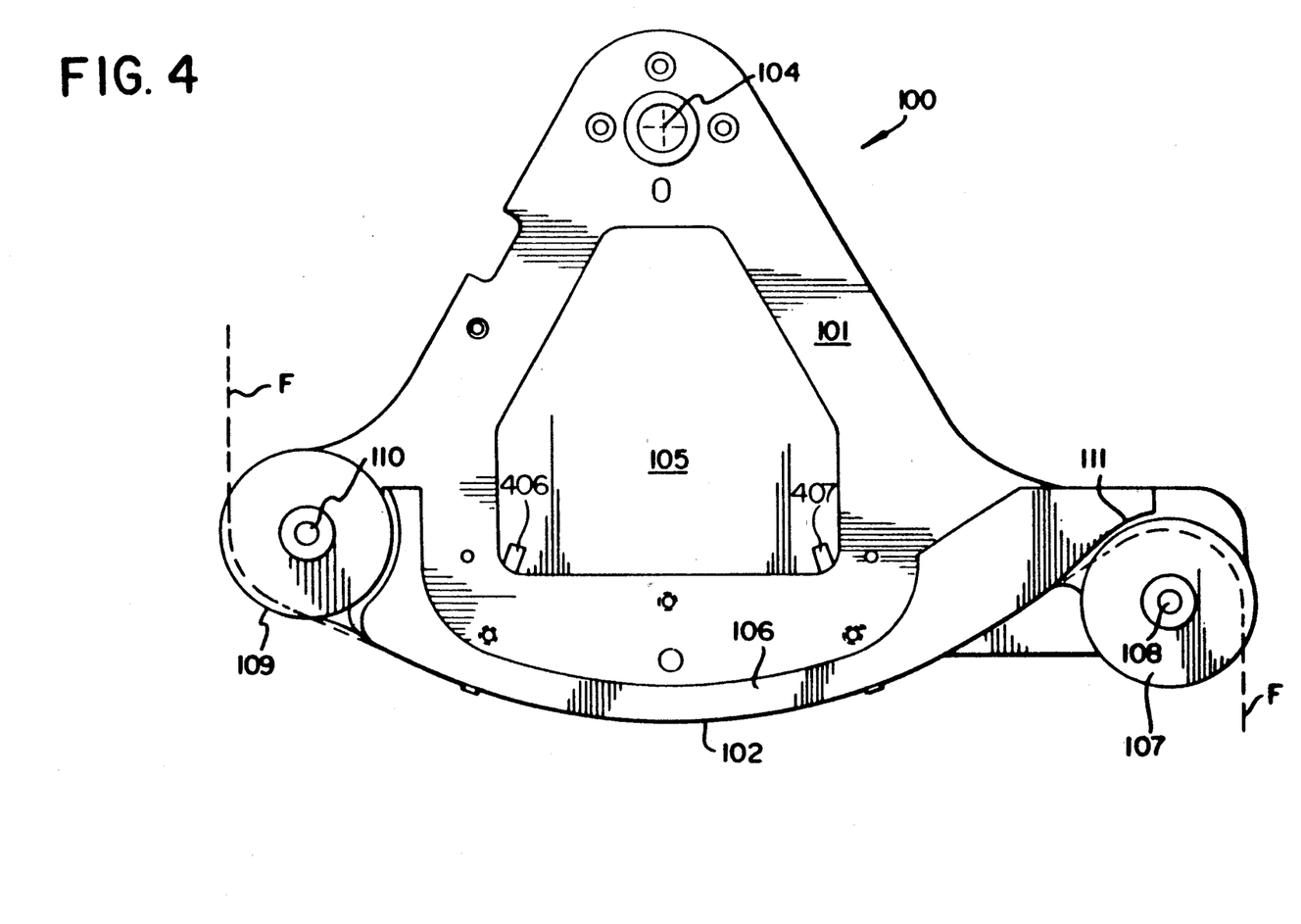
FIG. 4 is a front elevational view of the gate shown in FIG. 3 with the photographic film threaded therethrough.

Referring now to FIGS. 3 and 4, it can be seen that the gate 100 is a pie-slice-shaped circular arcuate segment supported at the optical chassis 400 and rotates about a pivot shaft 502 (FIG. 9) mounted through a vertical web 101. The details of the drive system per se form no part of the present invention and are provided in co-pending application Ser. No. 943,427 entitled SCANNING APPARATUS GATE DRIVE SYSTEM AND METHOD filed in the names of Eric P. Hochreiter, et. al. on Sep. 14, 1992. Such description, though not necessary to an understanding of the operation of the gate of the present invention, is incorporated by reference herein. It is sufficient to say that the gate drive system described in said application and a crank arm 501 (FIG. 9) forming a unitary part of the shaft of the drive system produces a pendulum-like motion of the gate 100 about the pivot axis so as to provide an arcuate movement of approximately 6½° side to side, i.e. a total of approximately 13°, so as to move the film past the imaging apparatus 15, 16 of the scanner 10 during the scanning operation.

Figure 9:
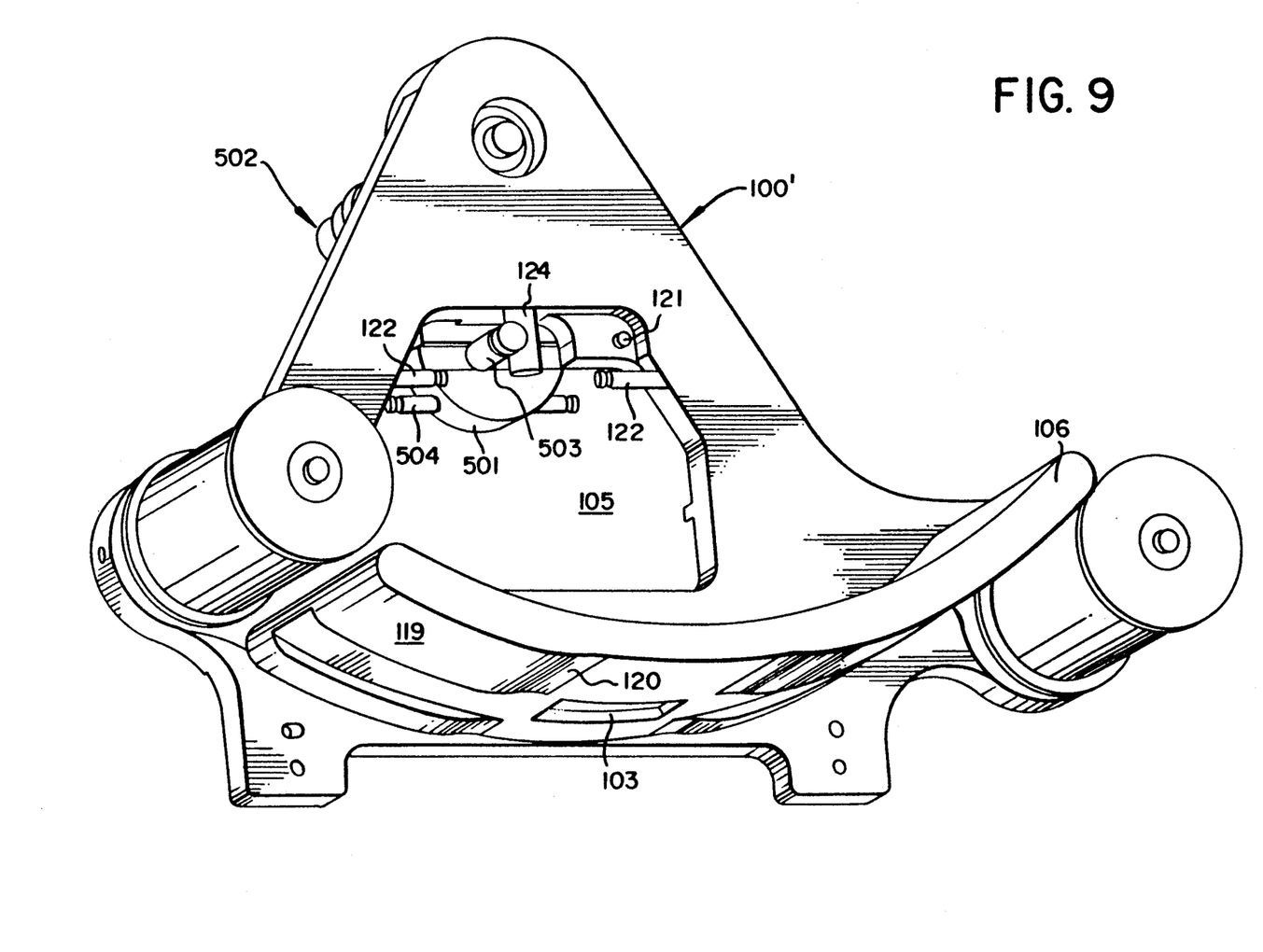
FIG. 9 is a perspective view of the gate embodiment shown in FIG. 8 and showing certain details of the gate drive system.

The gate drive system whose shaft and crank arm are shown in FIG. 9 are also mounted on the optical chassis 400, and the shaft 502 passes through an aperture 401 (FIG. 10) of the optical chassis 400. A central portion 105 of the gate 101 is cutaway and sized so as to provide room for movably mounting the gate 100 on the optical chassis 400, while permitting a mounting 410 (FIG. 10) which accommodates a conventional integrating cavity for illuminating the image on the film to pass through the gate 100.

The lower surface 102 of annulus segment 106 of the gate is provided with an aperture 103 through which the scanning operation is to take place as described above. A clamp mechanism 300 (shown generally in FIG. 2) can be attached to the gate 100 on a mounting surface so as to clamp the film F around the periphery of the aperture 103 at a desired frame. Although not necessary to an understanding of the operation of the gate 100 of the present invention, description of the clamping arrangement 300 is found in co-pending application Ser. No. 943,423 entitled CLAMPING ARRANGEMENT FOR FILM SCANNING APPARATUS filed in the names of Eric P. Hochreiter, et. al. on Sep. 14, 1992, the contents of which are incorporated by reference herein.

An entrance idler roller 107 pivoted on a journal 108 is provided at one end of the gate 100 into which the film F is led as shown in FIG. 4, and an exit idler roller 109 pivoted on a journal 110 is provided at the opposite or exit end of the gate 100. Both rollers 107, 109 rotate freely about the respective journals 108, 110. In FIG. 4, the film F designated by the dashed dotted lines and is shown being lead over the entrance idler roller 107 and under exit idler roller 109 as the film F passes over the scanning surface 102 of the gate 100 during film transport. It will be seen that the surface 102 on the annulus segment 106 of the gate 100 in the area approximate the entrance idler roller 107 is provided with a slight curvature 111. The slight curvature 111 as well as the placement of the idler rollers 107, 109 are sized and configured so as to assist in providing a smooth transition path for the film attached to the laminate, in the absence of which the edge of the film F may not properly be in the tracking area for achieving proper registration with the aperture 103 and the best possible resolution of the image on the film for digitization by the imaging system 16.

Figure 10:
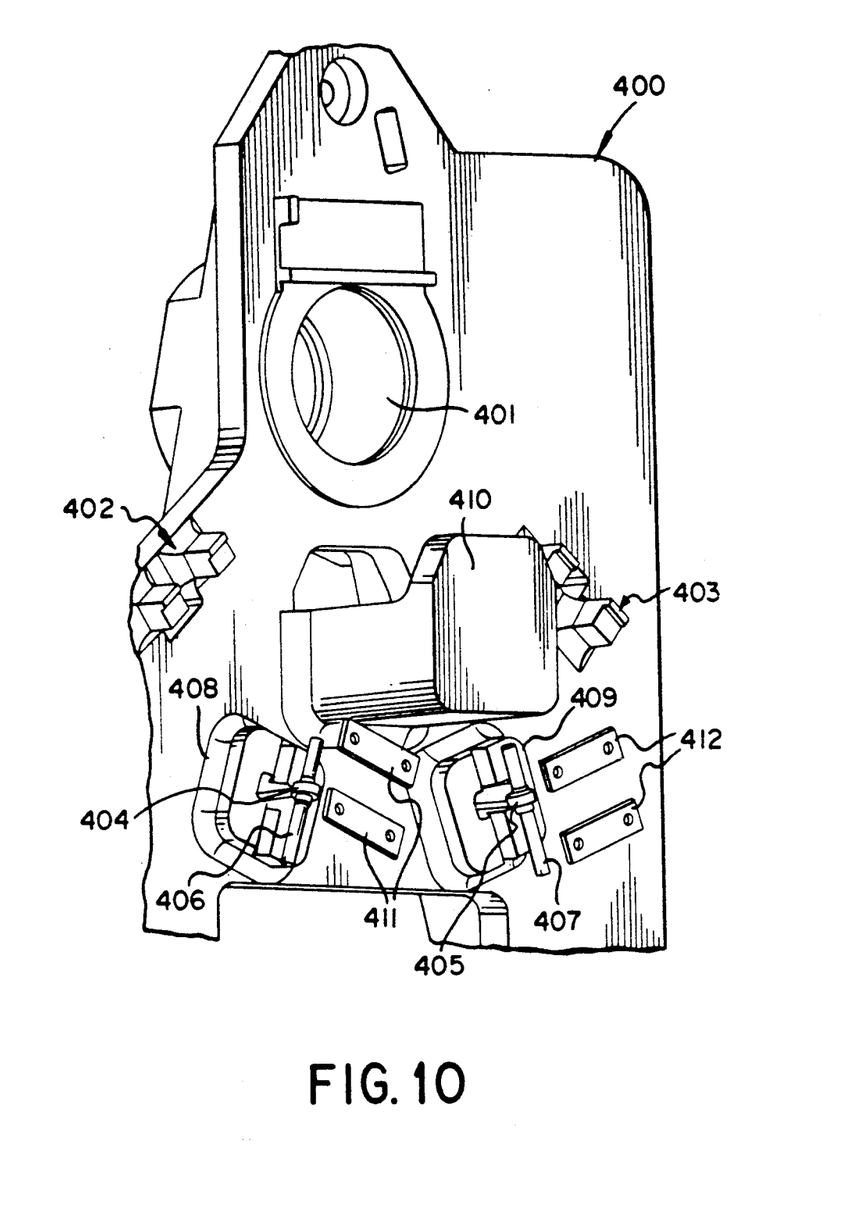
FIG. 10 is a partial perspective view of the front of the optical chassis of the scanning apparatus showing the eccentric shafts and bearings against which the wear plate of both embodiments of the gate is registered when assembled and operational.

It will also be understood that the aperture 103 against which the frame of film F to be imaged is clamped is symmetrical about the pivot axis 104 in the initialization position of the gate 100 so that a complete scanning operation takes place as the gate moves from the extreme right side to the extreme left side of the arc and vice versa. Although this arc is about 15°, the gate can actually travel through an arc of about 8½° of motion on each side of the vertical to provide a safety factor in the event of failure of gates sensor mounted at 402, 403 on the optical chassis 400 as shown in FIG. 10. In this connection, the gate 100 initializes itself to two sensors on the optical chassis 400 at start-up so as to identify an initializing position which is the prescanning vertical position that the gate 100 assumes during the prescanning operation of the film. During prescanning, the gate 100 does not move. When the high resolution pass takes place after the film F has been prescanned and rewound back onto the supply reel 12, the gate swings to the home position (i.e. to the right as shown in FIGS. 1 and 2) based on a count of motor steps from the vertical initializing position. The gate then stops and waits for the film F to advance to the correct frame where the film is then clamped by the clamping mechanism 300, and the gate 100 is rotated in about 4 seconds to the leftmost position through an arc of about 15° to drive the film over the imaging apparatus 15, 16. If, however, the gate sensing system were to fail, the gate 100 would nevertheless continue to move slightly beyond the sensor position so that it could ride up against a portion of the optical chassis 400 where no damage will be done to the other components of the scanning apparatus 10.

Figure 6:
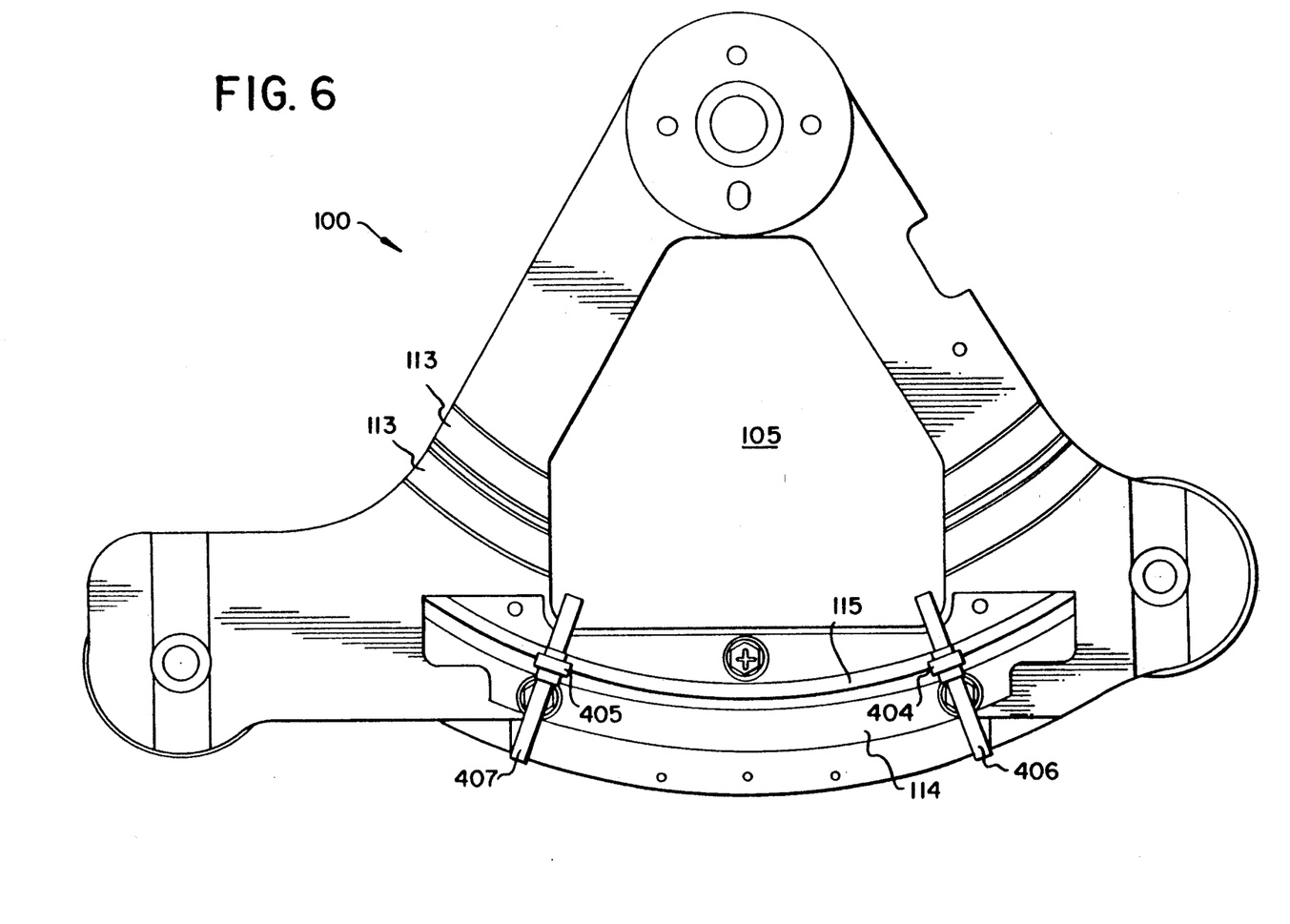
FIG. 6 is a rear elevational view of the gate shown in FIGS. 3 to 5.
Figure 7:
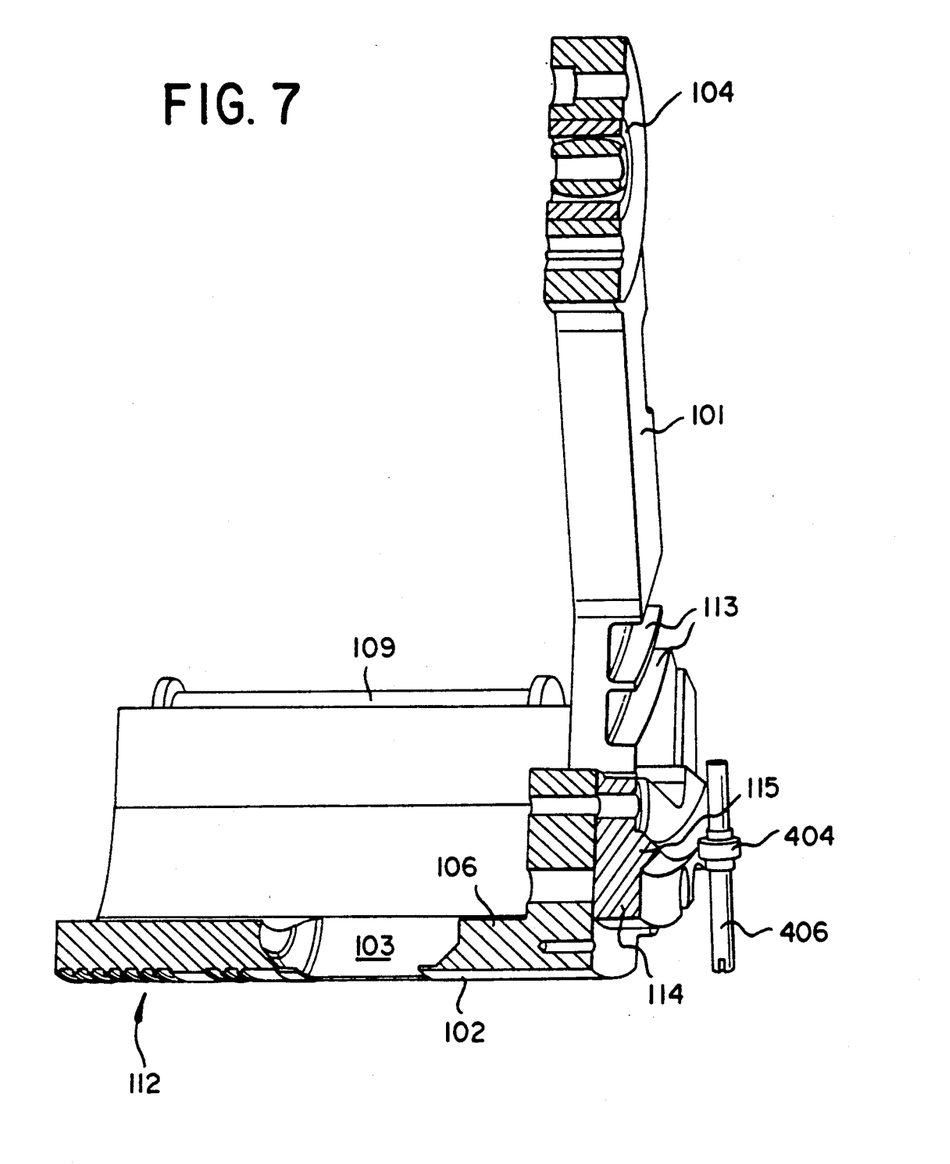
FIG. 7 is a cross-sectional side perspective view showing more details of the configuration of the scanning surface, the wear plate and the spherical pivot bearing of the gate of FIGS. 3 to 6.

As seen in FIGS. 3 and 7, the arcuate lower surface 102 of the annulus segment 106 can be provided with a ribbed portion 112 to reduce the amount of surface of the gate in contact with the standard paper laminate used in reorders and thereby also reduce frictional drag and the possible buildup of a static charge and dirt which could damage the components of the scanning apparatus 10. The backside of the gate shown most clearly in FIGS. 6 and 7 has two arcuate slots 113 which provide clearance for and cooperate with the sensors arranged in the mounts 402, 403 on the optical chassis 400 as shown in FIG. 10.

It can now be readily appreciated the present invention results in great simplification of the gate configuration, allows scanning in both directions with film transport, achieves the desired flatness of film for high resolution scanning, and permits the use of several film transport formats without modification of the scanning apparatus. The gate 100 can be made, for example, in a single piece from machined aluminum, although it will be appreciated that other manufacturing techniques and other materials may be used without departing from the scope of the present invention.

Figure 5:
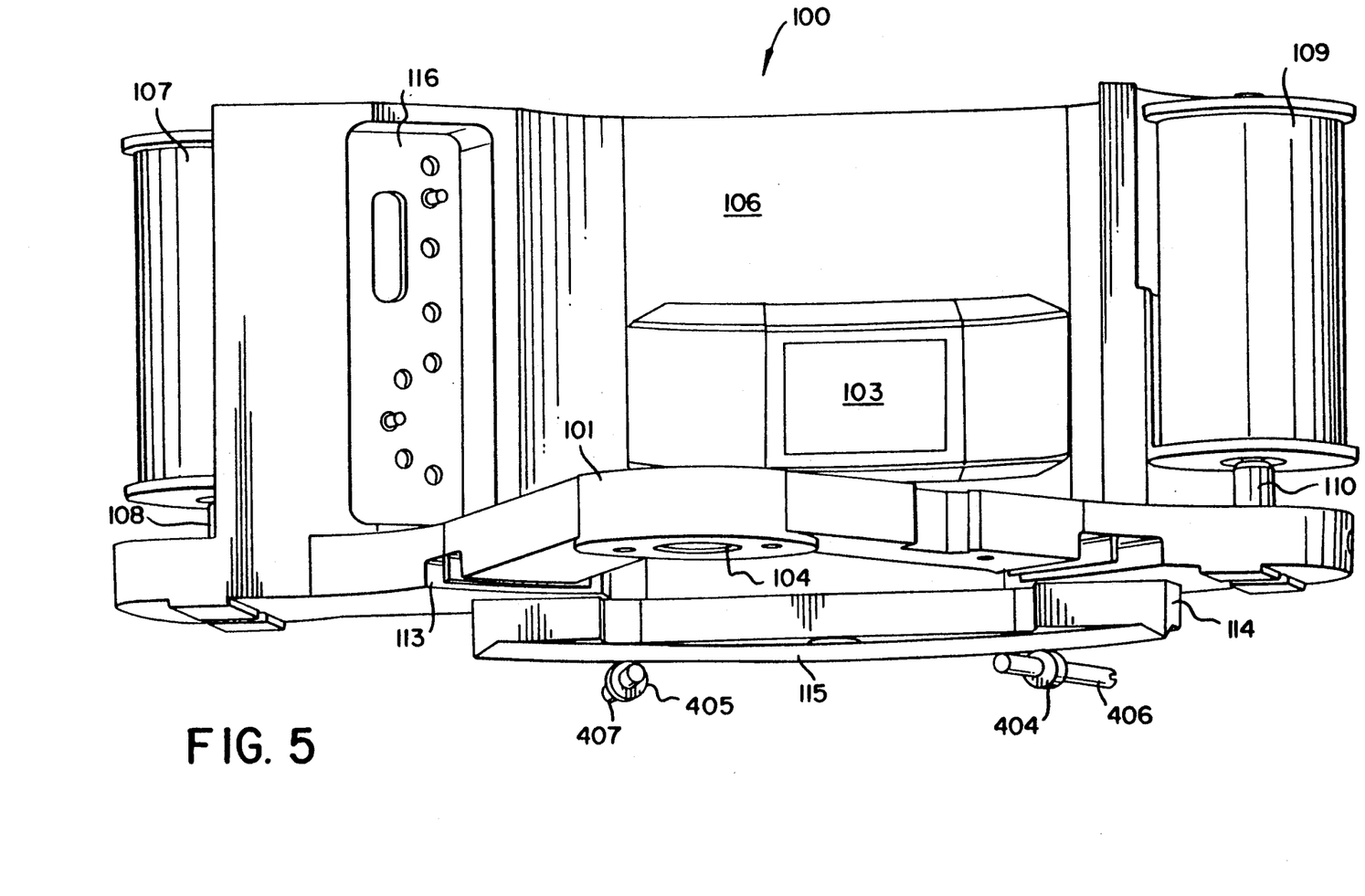
FIG. 5 is a top perspective view of the gate shown in FIGS. 3 and 4 showing the sensor mounting location on the gate annulus, and the wear plate and flag positions on the rear surface of the vertical web.

A hardened wear plate 114 having a projecting V-shaped portion 115 is provided on the rear side of the gate 100 as shown most clearly in FIGS. 5, 6 and 7 to allow the gate 100 to rotate on idler bearings 404, 405 on respective eccentric shafts 406, 407, respectively, which are held in respective bearing mounts 408, 409 on the optical chassis 400 as shown in FIG. 10, where the eccentric shafts 406, 407 are shown with their associated retaining plates 411 which are bolted to the mounts 408, 409 in an exploded position for a better understanding of the mounting arrangement. This mounting arrangement in which the V-portion 115 of the wear plate 114 registers against the bearings 404, 405 allows for adjustment of the gate 100 about two axes so as to provide fine adjustment for the scanning apparatus relative to the imaging unit 16. It will also be appreciated, of course, that the smoothness of the surface of the arcuate portion 102 of the gate 100 is important in determining how accurate the scanning operation will be.

In a typical operation of the scanning device 10 by a photographic lab, the film in which notches have been made along the edge for locating the scannable images, with or without a paper laminate having punched apertures is loaded on a supply reel 12 with a sufficient leader of defined length to thread over the stationary idler roller 25, the spring-biased tension roller 20, the stationary idler roller 22 adjacent the bar code reader 24, through the film cleaner unit 18, and the DX bar code reader 17, then over the gate 100, through the capstan mechanism 14, over the spring-biased tension roller 19, over the stationary idler 23 and onto the take-up reel 13. The apparatus 10 is then run through a prescanning or "low resolution" pass in which the gate 100 is held in its central or initializing position shown in FIG. 2. After the data on the film itself and/or on a Kodak standard, URS standard and the like laminate paper strip attached to the film F has been prescanned, the film F is rewound onto the supply reel 12.

After rewinding is complete, the apparatus 10 is now ready for the "high resolution" scanning operation in which the images contained on selected frames of the film can be scanned and digitized with sufficient resolution in a known manner by the light from the integrating cavity 15 and the LCM imaging unit 16 performing a line-by-line scan across the film through the aperture 103 of the gate. Typically, at the start of the high resolution pass the gate 100 is moved from its initializing position shown in FIG. 2 to a "home" position on the right hand side by being rotated counterclockwise through an arc of about 6½°. In this location, the film F will be scanned in about 4 seconds line-by-line from the left-hand edge of the aperture 103 as seen in FIG. 5 with the scanning proceeding line-by-line toward the right edge of the aperture during which the previously-mentioned solenoid-actuated clamping mechanism designated generally by numeral 300 in FIGS. 2–4 clamps the film frame against the aperture. The capstan mechanism 14 advances the film F such that the desired frame film is located in the exact area of the aperture 103 of the gate 100 where the scanning is to be accomplished. The capstan mechanism 14 then disengages, and a motor (not shown) starts the gate 100 moving from the right hand side toward the vertical position and up towards the left hand side until the gate is in its left most position after having traversed another arc of about 6½° as measured from the vertical initializing position shown in FIG. 2. During this movement of the film F, line-by-line scanning of the frame over the aperture is scanned to digitize the image thereon while the web tension is maintained by the tensioning arms 19, 20.

Another important advantage of the present invention is that the gate is compact and permits integration of a sensor in a recessed portion 116 of the annulus segment 106 as seen in FIG. 5. Apertures are provided in the recessed portion 116 to allow the sensor which is of conventional construction to receive light signals from a conventional LED in response to the encoded information obtained from the film F during the prescanning operation in a manner which is generally known. The important aspect for present discussion is that the sensor locations integrate into the gate itself the positioning and image identification data. As previously noted, the configuration and spacing of the entrance roller 107 with the slight curvature 111 provide the desired wrap of the film F and laminate so that the film is also held close to the arcuate surface in the area of the sensor aperture so that the sensors can accurately sense the positional data on the film and/or laminate.

To prevent scratching of the film to the greatest extent possible, an image relief area 117 of smaller radius, as seen somewhat exaggerated in FIG. 3, is provided on the surface 102 leading up to and away from the aperture 103 with a transition region 118 and of a width so that only the tracks of the film F ride on the surface 102 in the region of the relief areas 117, 118 to eliminate surface contact with the image area on the film and to ensure that tracking takes place only on the outside sprocket of the area where scratching is far less critical. The wrapping of the film and laminate attached thereto in a tight radius around the rollers 107, 109 assures close conformance of the film F with the arcuate surface 102 of the gate while, at the same time, the image relief areas 117, 118 prevent, to the maximum extent possible, scratching of the film since the tracks of the film ride on the surface, thereby leaving a space between the outer surface and that of the image relief area.

Figure 8:
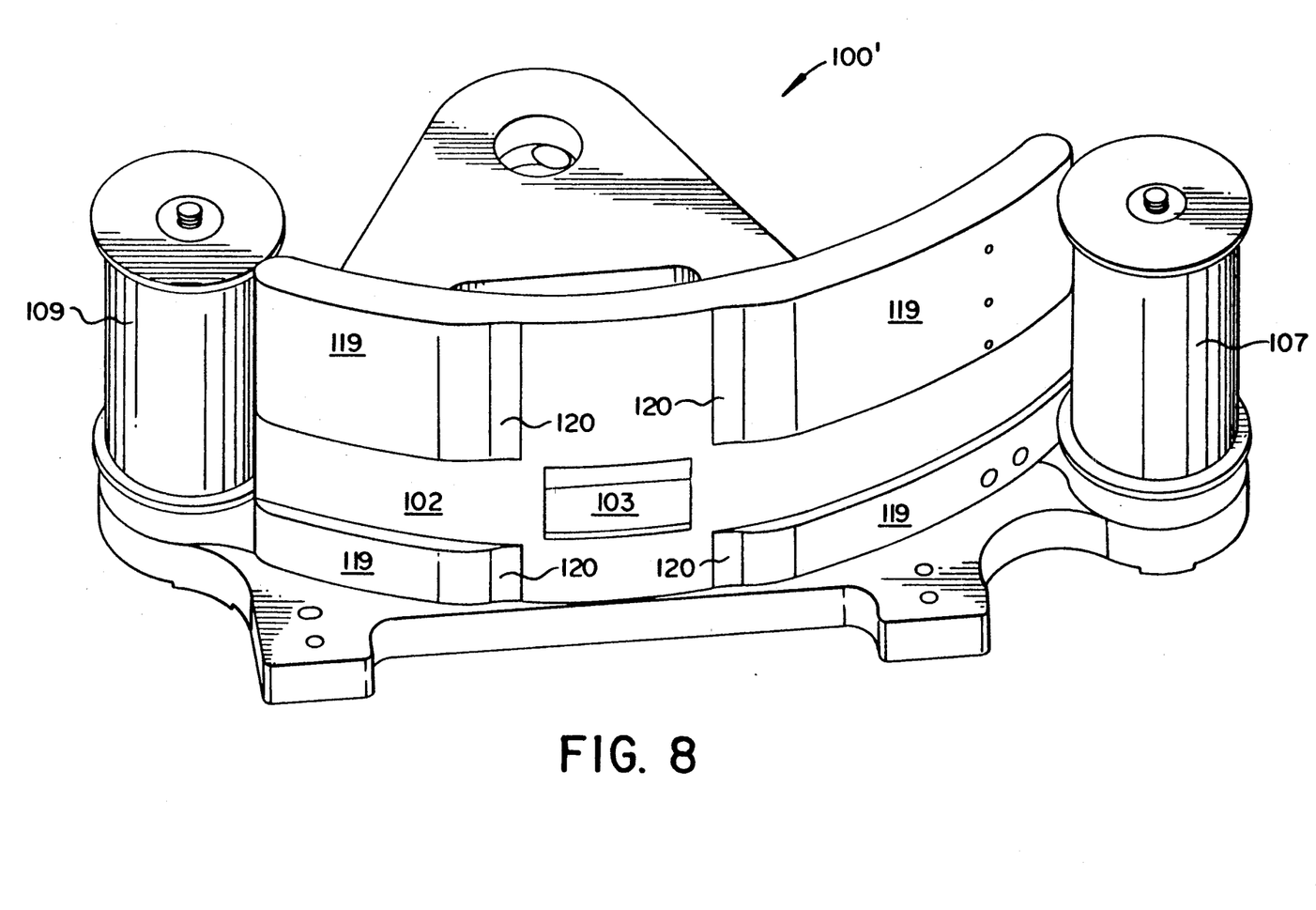
FIG. 8 is a bottom perspective view of a second embodiment of the gate in accordance with the present invention.

FIGS. 8 and 9 show another embodiment of the gate designated generally by the numeral 100' in which a different form of image relief to prevent scratching is provided and illustrated in somewhat exaggerated proportion. Inasmuch as most of the other features of this embodiment are similar to the embodiment shown in FIGS. 3 to 7, further description of similar parts is dispensed with here. In particular, the tracks of the film F ride on a surface 119 of slightly greater radius than the surface 102 into which the aperture 103 opens. To permit clamping of the film flat against the aperture 103 by the clamping arrangement 300, sloping transition surfaces 120 leading down to the surface 103 from the direction of the entrance roller 107 and up toward the surface 119 in the direction toward the exit roller 109 are provided to assure a gentle transition and again prevent the image area of the film F from coming into contact with the arcuate surface of the gate except when absolutely necessary to clamp the image flat at the aperture 103. In this embodiment, it is not necessary to provide the slightly curved portion 111 in proximity to the entrance roller. Instead, the annulus segment 106 is approximately a smooth curve from the entrance roller 107 to the exit roller 109 with the exception of the surfaces 119, 120.

It should further be noted that the six inch radius from the pivot axis to the surface 102 through which the aperture 103 extends is important because it defines a profile which assures that a line as straight as possible can be maintained across the width of the film F and dictates a velocity of gate movement over about a 4 second period that produces a high quality scan with currently available imaging components 15, 16.

A pin 121 is mounted through both sides of a flange of the gate 100'. A tension spring (not shown) is connected between the pin 503 pressed into the crank arm 501 of the drive system. Likewise, pins 122 extend laterally into the aperture 105 from the gate web 101. A tension spring (not shown) is connected between each of the pins 122 and a respective pin 504 extending laterally outward from the crank arm 501. A pin 124 extending downwardly from the web 101 into the web aperture 105 is positioned to abut the pin 503 so as to be driven by the crank arm 501 of the drive system. The foregoing system of pins and springs is also used in the gate embodiment of FIGS. 3 to 7 and provides for adjustability of the gate in two axes and biasing of the gate rearwardly to register the V-portion 115 of the wear plate 114 against the bearings 404, 405.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A gate for a photographic film scanning apparatus, comprising an arcuate segment shaped member having an arcuate scanning surface located at a lower portion thereof with a scanning aperture therethrough, means for pivoting the member, idler rollers located near each end of the arcuate scanning surface so as to maintain photographic film to be scanned in close proximity to the arcuate scanning surface, and means for preventing scratches on an image area of the photographic film as it passes over the arcuate scanning surface except in the region of the scanning aperture.

2. The gate according to claim 1, wherein the member includes a wear plate on a side thereof adjacent bearings mounted on an optical chassis of the scanning apparatus, the wear plate being configured to register against the bearings.

3. The gate according to claim 2, wherein the pivoting means comprises a spherical bearing mounted in the member to permit oscillation of the gate about one axis for scanning and to permit adjustment of the gate in two other axes for alignment with optical components of the scanning apparatus.

4. The gate according to claim 3, wherein the scratch preventing means comprises a recessed portion of smaller radius than the radius of the arcuate scanning surface on two sides of the scanning aperture.

5. The gate according to claim 3, wherein the scratch preventing means comprises raised portions of greater radius than the radius of the arcuate scanning surface on two sides of the scanning aperture.

6. The gate according to claim 3, wherein means is provided for attaching a clamping device selectively to clamp the photographic film at the scanning aperture.

7. The gate according to claim 6, wherein the radius from the pivoting means to the aperture is six inches.

8. The gate according to claim 7, wherein means is provided for accommodating a sensor in the arcuate surface.

9. The gate according to claim 8, wherein the scratch preventing means comprises a recessed portion of smaller radius than the radius of the arcuate scanning surface on two sides of the scanning aperture.

10. The gate according to claim 8, wherein the scratch preventing means comprises raised portions of greater radius than the radius of the arcuate scanning surface on two sides of the scanning aperture.

11. The gate according to claim 1, wherein the pivoting means comprises a spherical bearing mounted in the member to permit adjustment of the gate about two axes for alignment with optical components of the scanning apparatus.

12. The gate according to claim 1, wherein the scratch preventing means comprises a recessed portion of smaller radius than the radius of the arcuate scanning surface on two sides of the scanning aperture.

13. The gate according to claim 1, wherein the scratch preventing means comprises raised portions of greater radius than the radius of the arcuate scanning surface on two sides of the scanning aperture.

14. The gate according to claim 1, wherein means is provided for attaching a clamping device selectively to clamp the photographic film at the aperture during scanning so as to move the film as the gate traverses an arc.

15. The gate according to claim 1, wherein the radius from the pivoting means to the scanning aperture is six inches.

16. The gate according to claim 1, wherein means is provided on the gate for accommodating a sensor in a region of the arcuate scanning surface.

17. The gate according to claim 1, wherein means is provided on a surface of the member facing an optical chassis of the scanning apparatus for cooperating with gate positioning sensors mounted on the optical chassis.

18. In a scanning apparatus having a means for digitizing at least one preselected image on a photographic film, the improvement comprising a gate configured as an arcuate-segment-shaped member having an aperture at an arcuate scanning surface located at a lower portion thereof, means for pivoting the member, idler rollers located near each end of the arcuate scanning surface so as to maintain photographic film to be scanned in close proximity to the arcuate scanning surface, and means for preventing scratches on an image portion of the photographic film as it passes over the arcuate scanning surface, wherein the gate is arranged in the scanning apparatus to move in a pendulum-like manner and transport the film across the digitizing means for line-by-line scanning of the photographic film in each direction of movement of the gate.

* * * * *